United States Patent
Takagi (10) Patent No.: US 6,846,022 B2
(45) Date of Patent: Jan. 25, 2005

(54) UNIVERSAL JOINT

(75) Inventor: Shigeru Takagi, Tokyo (JP)

(73) Assignee: Daisen Co., Ltd., Tokyo (JP)

( * ) Notice: Subject to any disclaimer, the term of this patent is extended or adjusted under 35 U.S.C. 154(b) by 0 days.

(21) Appl. No.: 10/369,160

(22) Filed: Feb. 19, 2003

(65) Prior Publication Data

US 2003/0156893 A1 Aug. 21, 2003

(30) Foreign Application Priority Data

Feb. 20, 2002 (JP) .................................. 2002-042618
May 8, 2002 (JP) .................................. 2002-132380

(51) Int. Cl.[7] .............................................. F16L 27/04
(52) U.S. Cl. ..................... 285/146.1; 403/56; 285/181; 285/262
(58) Field of Search ................. 403/56; 285/146.1, 285/146.2, 146.3, 181, 261, 262, 267

(56) References Cited

U.S. PATENT DOCUMENTS

| | | | |
|---|---|---|---|
| 1,884,944 A | | 10/1932 | Williams |
| 2,680,358 A | * | 6/1954 | Zublin ................. 285/146.1 X |
| 4,501,511 A | * | 2/1985 | Albert, Jr. ................ 403/114 X |
| 4,704,043 A | * | 11/1987 | Hackman et al. ........ 403/143 X |
| 6,705,647 B1 | * | 3/2004 | Palmer ........................ 285/261 |

FOREIGN PATENT DOCUMENTS

| | | | |
|---|---|---|---|
| DE | 56622 | 5/1891 | |
| GB | 287594 | 3/1928 | |
| GB | 484838 | 5/1938 | |
| GB | 846905 | 8/1960 | |
| JP | 04-236884 | 8/1992 | ........... F16L/27/12 |

* cited by examiner

Primary Examiner—John R. Cottingham
(74) Attorney, Agent, or Firm—Chapman and Cutler LLP (57) ABSTRACT

A universal joint including a first tubular member, a second tubular member, and an intermediate tubular member for connecting the first and second tubular members, the intermediate tubular member having at one end an outer spherical part and at the other end a cylindrical part, the first tubular member having at one end an inner spherical part in which the outer spherical part of the intermediate tubular member is inserted to move universally, and the second tubular member having at one end a hole in which the cylindrical part of the intermediate tubular member is rotatably inserted, the inner spherical part having an axis oblique at an angle to an axis of the outer spherical part of the intermediate tubular member.

9 Claims, 9 Drawing Sheets

UNIVERSAL JOINT

BACKGROUND OF THE INVENTION

1. Field of the Invention

The present invention relates to a universal joint for connecting two tubular members through which fluid is passed

2. Description of the Prior Art

Figure 7:
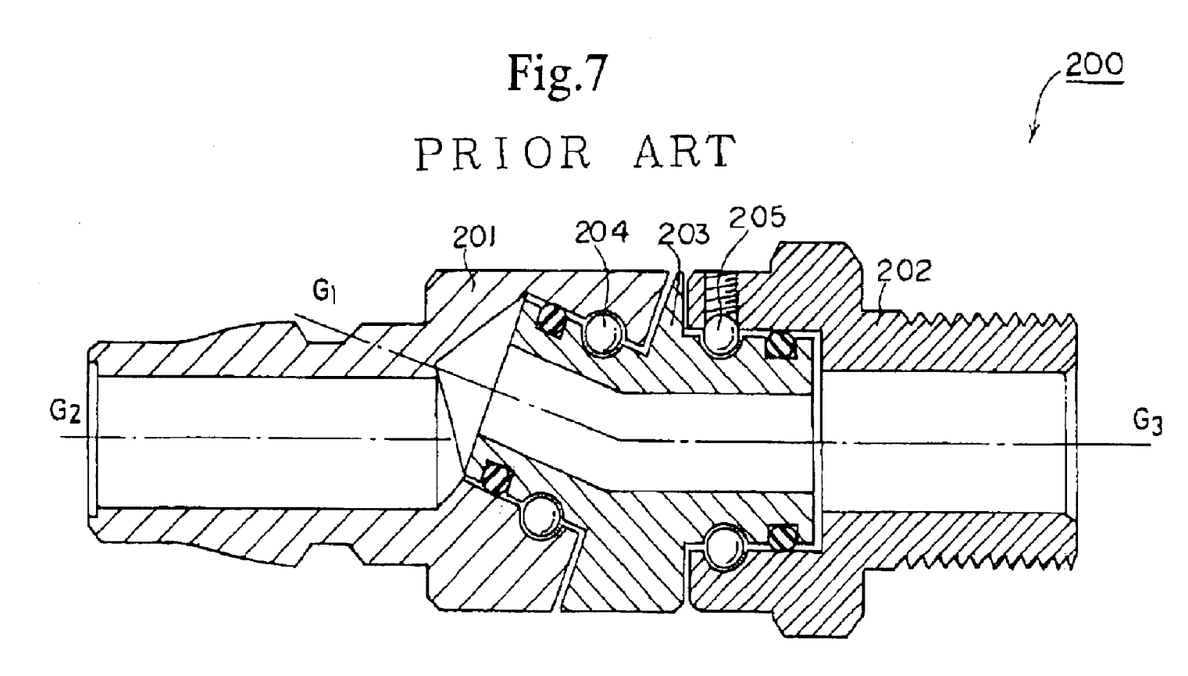
FIG. 7 is a sectional view showing a first conventional universal joint.

A first conventional universal joint is shown in FIG. 7. The universal joint 200 comprises a plug member 201 whose one end is connected with a horse or socket (not shown), an intermediate tubular member 203 whose one end is rotatably connected through ball bearings 204 with the plug member 201 and a sleeve member 202 which is at its one end connected through ball bearings 205 with the other end of the intermediate member and at the other end connected with an instrument of an air tool and so on (not shown).

An axis G1 of one end of the intermediate tubular member 203 is inclined at an angle to axes G2 and G3 of the plug and sleeve members 201 and 202, which are in alignment with one another.

The plug member 201 is universally moved relative to the sleeve member 202 at the angle formed between axes of the plug and intermediate tube members by rotating the plug member 201 relative to the intermediate tubular member 203.

Figure 8:
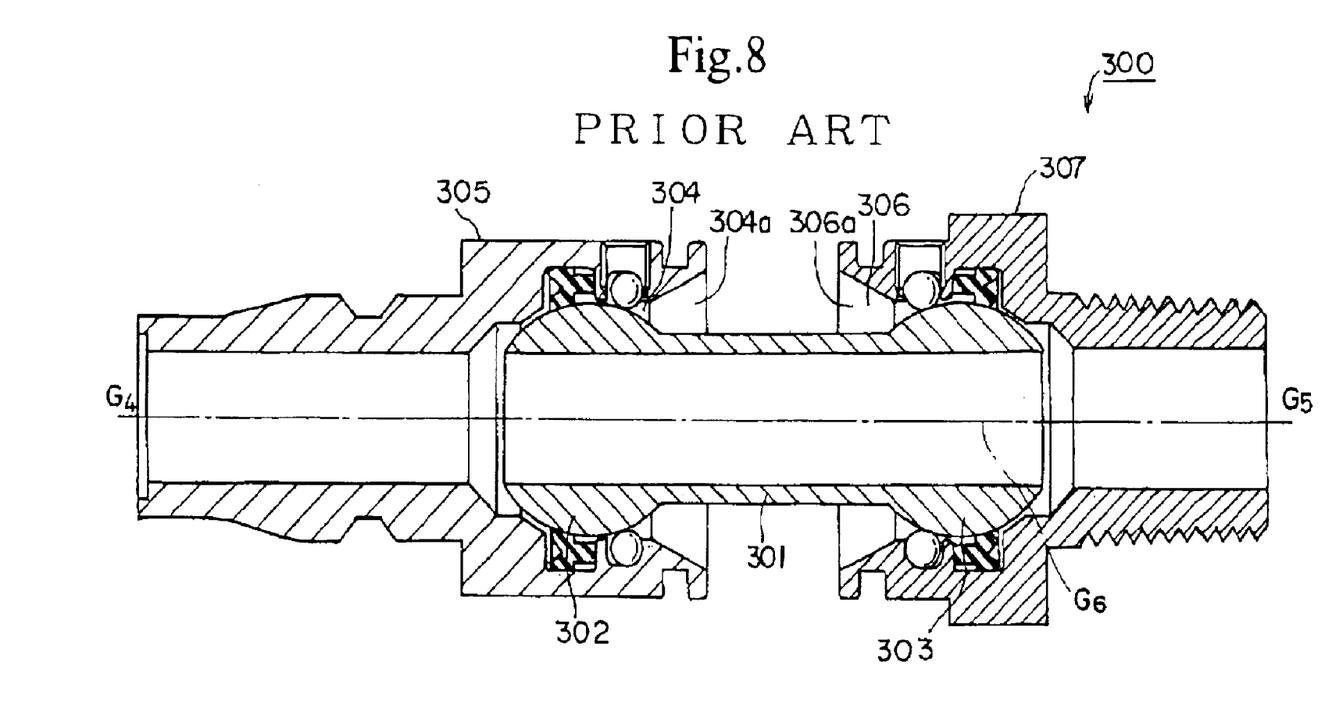
FIG. 8 is a sectional view showing a second conventional universal joint.

A second conventional universal joint is shown in FIG. 8. The universal joint 300 comprises an intermediate tubular 301, a plug member 305 connected with the intermediate tubular member 301 and a sleeve member 307 connected with the intermediate tubular member 301. The intermediate tubular member 301 has at its opposite ends first and second outer spherical parts 302 and 303.

One end of the plug member 305 is provided with an inner spherical surface 304 in which the first outer spherical part 302 is inserted to move universally the plug member relative to the intermediate tubular member and one end of the sleeve member 307 is provided with an inner spherical surface 306 in which the second outer spherical part 303 is inserted so as to move universally the sleeve member relative to the intermediate tubular member.

Accordingly, axes G4 and G5 of the plug and sleeve members 305 and 307 can be mutually relatively changed in any angles by rotating the plug member or sleeve member.

As a third conventional universal joint, there is known a universal joint disclosed in Japanese Laid-Open Publication 4-236884.

Figure 9A:
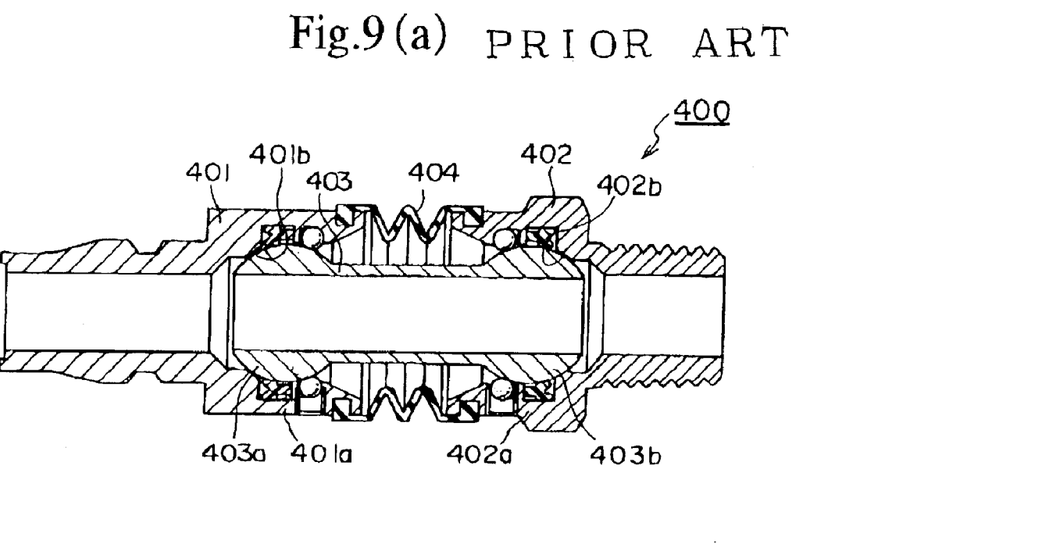
FIG. 9(a) is a sectional view showing a third conventional universal joint.

As shown in FIG. 9, the universal joint 400 comprises an intermediate tubular member 403, first and second tubular members 401 and 402 connected with the intermediate tubular member 403 and a cover 404 surrounding the intermediate tubular member 403 between the first and second tubular members 401 and 402.

The intermediate tubular member 403 has at its opposite ends first and second outer spherical parts 403a and 403b.

One end 401a of the first tubular member 401 is provided with an inner spherical surface 401b in which first outer spherical part 403a is inserted so as to move universally the first tubular member 401 relative to the intermediate tubular member 403 and one end 402a of the second tubular member 307 is provided with an inner spherical surface 402a in which the second outer spherical part 403b is inserted so as to move universally the second tubular member relative to the intermediate tubular member.

Figure 9B:
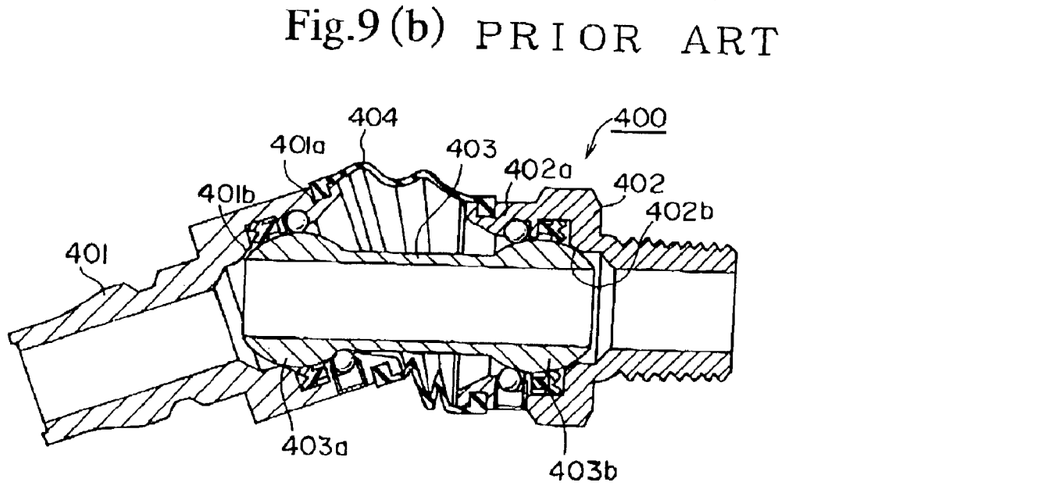
FIG. 9(b) is a view explaining an operation of the universal joint shown in FIG. 9(a).

The cover is attached to the ends 401a and 402a of the first and second tubular members 401 and 402 and acts to prevent any dirt from entering in a space between the first and second tubular members 401 and 402. The cover is made of a flexible material such as rubber to expand and contract. The cover is adapted to expand and contract following to the universal movement of the first and second tubular members as shown in FIG. 9(b).

However, in the first conventional universal joint as shown in FIG. 7, it is necessary to rotate the plug member 201 in any direction in order to change axes of the plug and sleeve members in a desire angle. Accordingly, the handling is not very good.

In the second conventional universal joint as shown in FIG. 8, since the opposite ends of the intermediate tubular member 301 are moved universally, the axes G4 and G5 are not stable. Consequently, for example, when a horse or socket is connected with the plug member 305, the connection is difficult since the axis G4 is deviated.

In the third conventional universal joint as shown in FIG. 9, since the cover 404 is adapted to expand and contract in accordance with the universal movement of the first and second tubular members, it is easy to deform, sometimes, is destroyed or removes from the first and second tubular members. When the horse or the like is connected with the first and second tubular members, there is a possibility that the cover is gripped by hands of a user or contacts with any instrument so that the cover is destroyed and removed from the first and second tubular members. If the cover is removed from the first and second tubular members, the dirt or the like enters through the space between the first and second tubular members in the joint to lose function of sealing.

SUMMARY OF THE INVENTION

The present invention is made in consideration of the problems of the aforementioned conventional universal joint. It is, therefore, an object of the present invention to provide a universal joint in which horse or the like is easy to connect with first and second tubular members and to remove therefrom without twisting the horse or the like and a good operationality is accomplished.

To achieve the above object, a universal joint according to the present invention comprises a first tubular member, a second tubular member, and an intermediate tubular member for connecting the first and second tubular members. In one embodiment, the first tubular member and intermediate tubular member are connected to move universally with respect one another.

The intermediate tubular member and second tubular member are connected to move rotatably with respect to one another.

The intermediate tubular member has at one end an outer spherical part and at the other end a cylindrical part. The first tubular member has at one end an inner spherical part in which the outer spherical part of the intermediate tubular member is inserted to move universally. The second tubular member has at one end a hole in which the cylindrical part of the intermediate tubular member is rotatably inserted.

It should be noted that an axis of said inner spherical part is oblique at an angle to an axis of said first tubular member.

Ball bearings are provided between said outer and inner spherical parts and between the hole of the second tubular member and cylindrical part of the intermediate tubular member.

Seal means are provided between said outer and inner spherical parts and between the hole of the second tubular member and cylindrical part of the intermediate tubular member.

Each of the aforementioned ball bearings comprises a plurality of balls.

Each of the aforementioned seal means comprises a seal member of elastic material.

In the embodiment, a universal joint comprises a first tubular member, a second tubular member, an intermediate tubular member for connecting movably the first and second tubular members, and a cover disposed between the first and second tubular members to cover a space therebetween.

The cover is contacted movably with each of the first and second tubular members. The cover is connected with first and second tubular members to be movable universally relative to them.

The cover has at one end a first inner spherical surface and at the other end a second inner spherical surface. The first tubular member has at one end a first spherical portion and said second tubular member has at one end a second spherical portion The first inner spherical surface of the cover is contacted movably and universally with the first spherical portion of the first tubular member. The second inner spherical surface of the cover is contacted movably and universally with the second spherical portion of the second tubular members.

One end of said cover is connected with the first tubular member to move universally relative to the first tubular member and the other end of the cover is connected with the second tubular member to rotate relative to the second tubular member.

In one example, the cover is maintainable a shape thereof even when said first and second tubular members are moved. The cover is made of a hardened material.

BRIEF DESCRIPTION OF THE DRAWINGS

FIGS. 3(a) and (b) are views for explaining an operation of the universal joint in the above embodiment.

DETAILED DESCRIPTION OF THE PREFERRED EMBODIMENTS

A first embodiment of a universal joint according to the present invention will be explained in connection with FIGS. 1 to 3 below.

Figure 1:
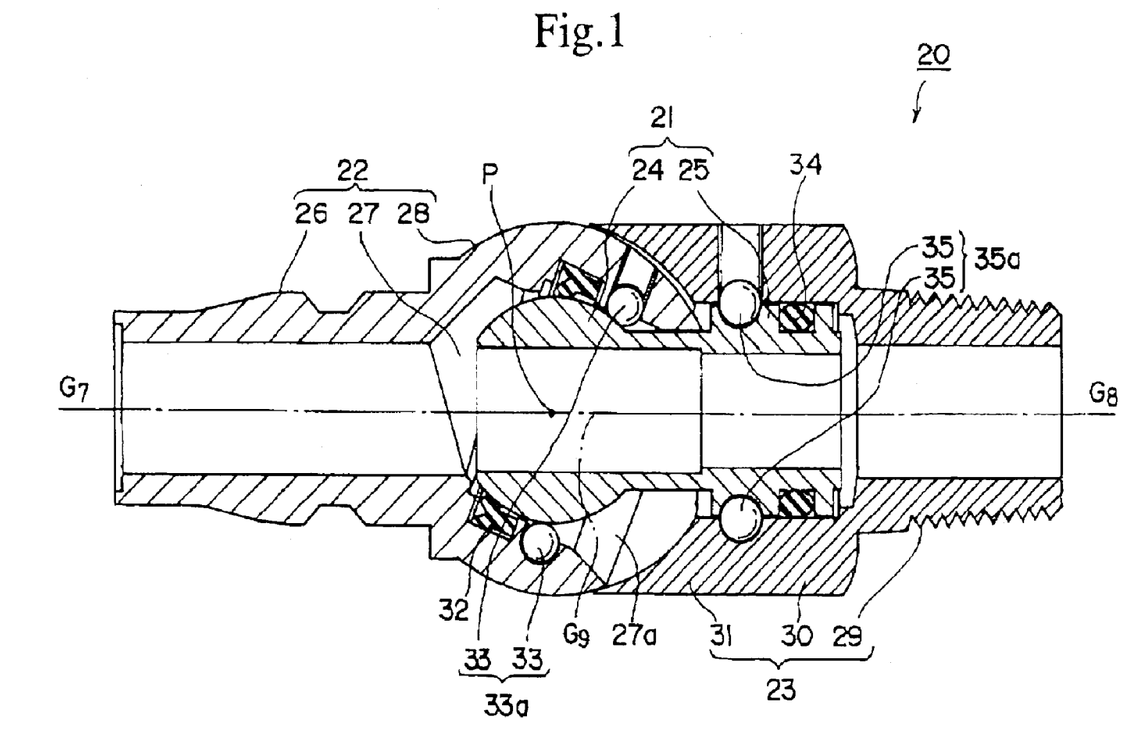
FIG. 1 is a sectional view a first embodiment of a universal joint according to the present invention.

Referring to FIG. 1, the universal joint 20 comprises an intermediate tubular member 21, a first tubular member or plug member 22 connected with the intermediate tubular member 21, a second tubular member or sleeve member 23 connected with the intermediate tubular member 21. With connection of the intermediate tubular, plug and sleeve members, one pipe through which fluid passes is formed. The intermediate tubular, plug and sleeve members are made of steel material or plastic resin and so on.

Figure 2A:
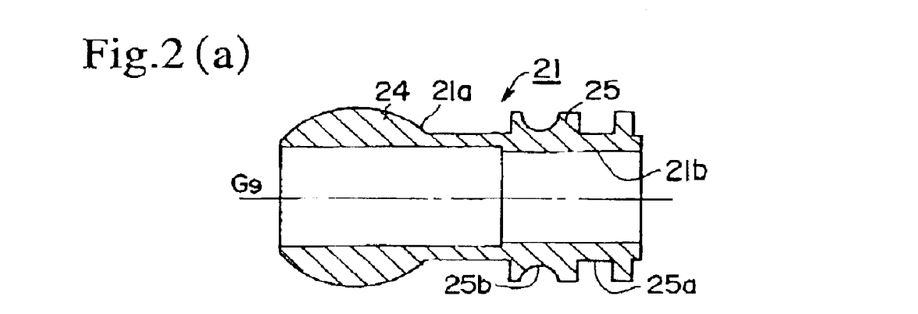
FIG. 2(a) is a sectional view of an intermediate tubular member used in the universal joint in the above embodiment as shown in FIG. 1.
Figure 3:
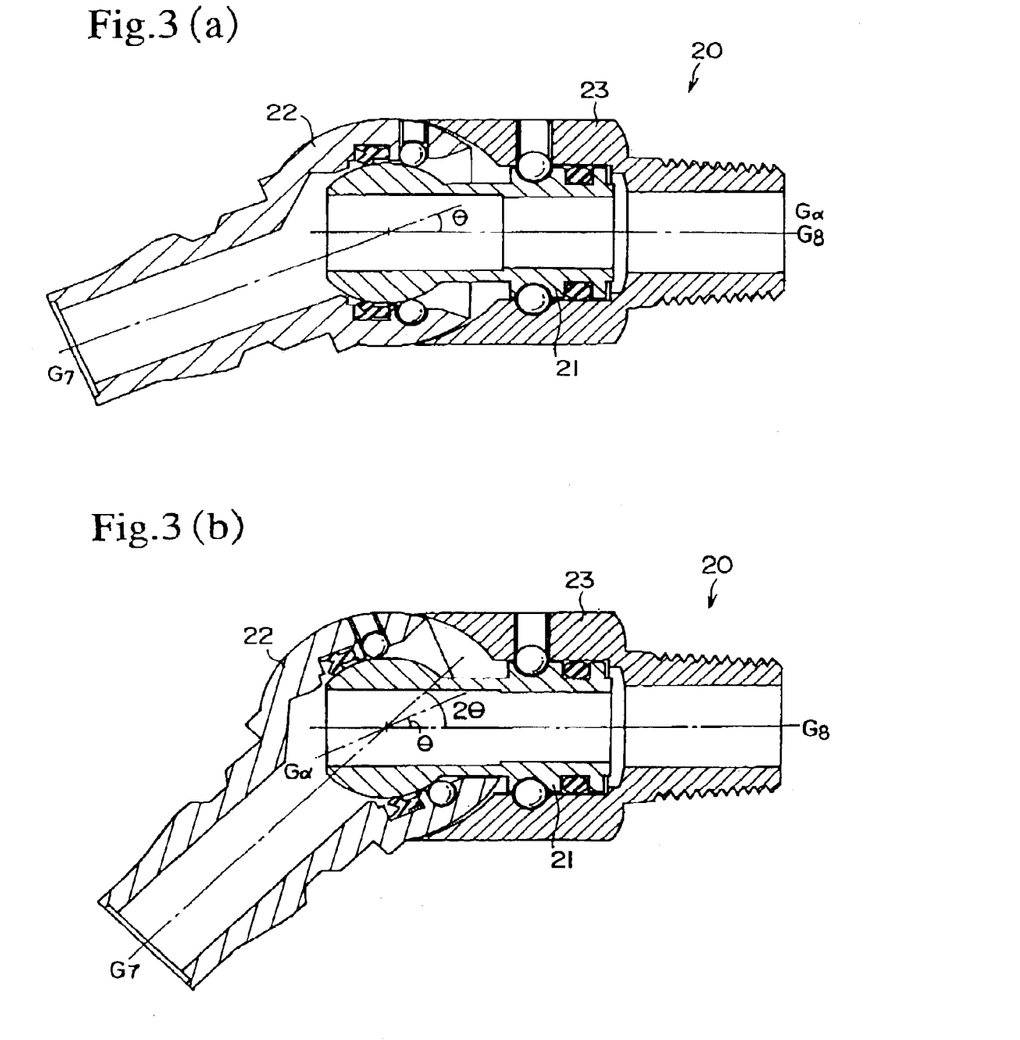

The intermediate tubular member 21 has at one end an outer spherical part 24 and at the other end a cylindrical part 25 as shown in FIG. 2a. The outer spherical part 24 is formed by shaping an outer circumferential surface 21a of the intermediate tubular member into a shape of sphere. The outer circumferential surface 21a of the intermediate tubular member 21 extends along an axis G9 in parallel with an inner circumferential surface 21a of a central hole of the intermediate tubular member 21.

Figure 2B:
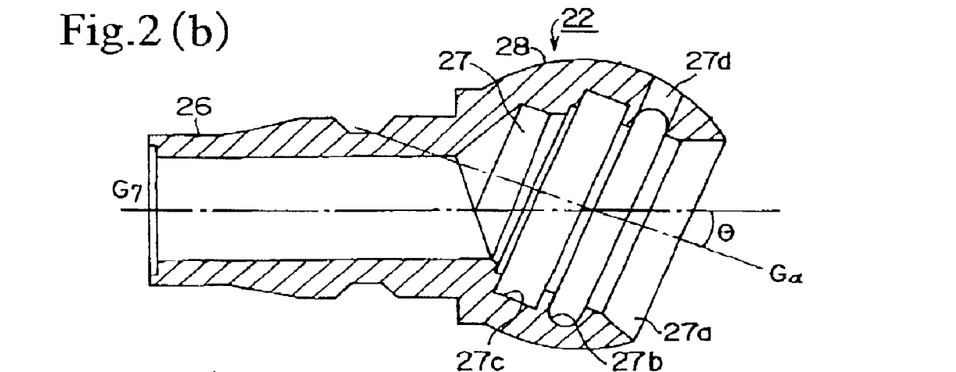
FIG. 2(b) is a sectional view of a first tubular member used in the universal joint in the above embodiment.
Figure 2C:
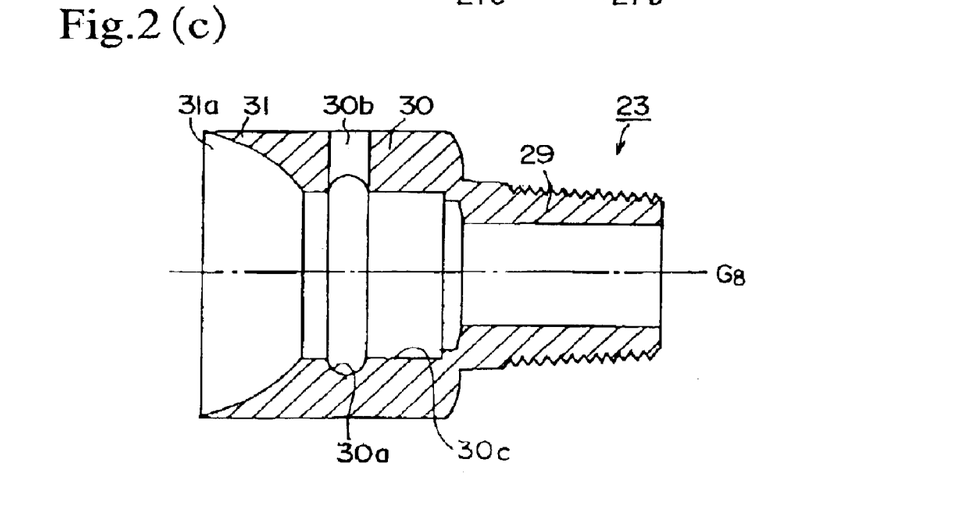
FIG. 2(c) is a sectional view of a second tubular member used in the universal joint in the above embodiment.

As shown in FIGS. 1 and 2(b), the plug member 22 has at one end a plug portion 26 to which a horse, a socket or the like is connected. The other end of the plug member 22 is provided with an inner spherical part 27 in which the outer spherical part 24 of the intermediate tubular member 21 is inserted. The plug portion 26 is tapered from the outer spherical part 24 to its leading end to be easy to insert the plug member into the horse and so on. It is noted that the inner spherical part 27 has an axis $G\alpha$ oblique at an angle $\theta$ transversely to an axis G7 of the plug member 22.

An anti-removing means is provided between the outer spherical part 24 of the intermediate tubular member 21 and the inner spherical part 27 of the first tubular member 22.

The anti-removing means comprises a ball bearing 33a which is composed of, for example, a plurality of metallic balls 33. The balls are inserted into an annular groove 27b formed on the inner spherical part 27. The balls are inserted into the annular groove 27b through a threaded hole 27d formed in the outer spherical part 28 after the outer spherical part 24 is inserted in the inner spherical part 27. A screw (not shown) is screwed in the hole 27d to prevent the balls from removing out of the annular groove 27b. The balls contact with an outer wall of the outer spherical part 24 to prevent the outer spherical part 24 from removing out of the inner spherical part 27, as shown in FIG. 1. It is preferable to provide a slight clearance between the ball bearing 33a and annular groove 27b along the axis G2 of the plug member.

A seal means is, also, provided between the outer spherical part 24 and the inner spherical part 27. The seal means, for example, comprises a seal member 32 which is inserted into an annular groove 27c formed in the inner spherical part 27. The seal member is made of, for example, rubber or elastic resin. The seal member 32 is into contact with the outer spherical part 24 of the intermediate tubular member 21 under pressure to prevent liquid from entering into a contacting portion between the outer spherical part 24 and the ball bearing.

In the embodiment shown in FIG. 1, the seal member 32 is composed of Y packing material whose two legs contact with the outer spherical part 24.

An opening end 27a of the inner spherical part is provided with a tapered hole which has a diameter larger than that of the inner spherical part.

It is preferable to arrange the ball bearing adjacent to the opening portion 27a and the seal member at a position remote from the opening portion 27a.

With above construction, the first tubular member (plug member) 22 and intermediate tubular member 21 are universally moved with respect to each other.

The sleeve member 23 has at one end a sleeve portion 29 and at the other end a cylindrical portion 30. The sleeve member 23 has an axis G8. The sleeve portion 29 has a threaded portion which is connected with a horse or instrument such as an air tool or the like. The cylindrical portion 30 is provided with a generally half spherical inner part 31 in which a portion of the outer spherical part 28 of the plug member 22 is inserted. An opening end 31a of the spherical inner part 31 has a more large diameter. The cylindrical portion 30 also has a hole 30c in which the cylindrical part 25 of the intermediate tubular member 21 is inserted.

An anti-removing means is provided between the cylindrical part 25 and the hole 30c of the cylindrical portion 30.

The anti-removing means comprises a ball bearing 35a which is composed of, for example, a plurality of metallic balls 35. The balls are inserted into an annular groove 25b of a half circle in section formed on the cylindrical part 25 and into an annular groove 30a of a half circle in section which is provided in the cylindrical portion 30 of the sleeve member 23 and which coincides with the annular groove 25 to form an annular groove of circular shape in section, through a threaded hole 30b provided in the cylindrical portion 30 after the cylindrical part 25 is inserted into the hole 30c.

After the balls are inserted into the annular groove, a screw is screwed into the threaded hole 30b to prevent the balls from removing out of the annular grooves 25b and 30a.

A seal means is provided between the cylindrical part 25 and the cylindrical portion 30 of the second tubular member 23.

The seal means comprises an O-ring 34 made of rubber which is inserted into an annular groove 25a formed on the cylindrical part 25. The O-ring 34 is in contact with the inner wall of the hole 30c under pressure.

With the above construction, the second tubular member (sleeve member) 23 is rotatable relative to the intermediate tubular member 21.

It is preferable to provide a slight clearance between the outer spherical part 28 and the inner spherical inner part 31 along the axis G8 since the cylindrical part 25 of the intermediate tubular member 21 is mainly supported by the ball bearing 35a.

In the aforementioned universal joint, the sleeve portion 29 is screwed in and fixed to the horse or the like and the plug member 26 is fixed to the horse or the line by the plug portion 26 being inserted therein. Here, since the plug member 22 and intermediate tubular member 21 performs a universal movement, if the leading end of the plug portion 26 is moved in a desired direction, it is possible to direct easily the plug member 22 relative to the intermediate tubular and sleeve members 21 and 23.

In an initial position as shown in FIG. 1, the axis G7 of the plug member 22 coincides with the axis G8 of the sleeve member 23 and the axis G2 of the outer spherical part 28 of the plug member 22 is inclined to the axis G7 of the plug member 22 at the angle θ which is a minus angle as shown in FIGS. 1 and 2(b).

As a result, when the axes G2 and G8 coincide with each other, the axis G7 of the plug member 22 becomes at the angle θ to the axis G8 of the sleeve member 23 (see FIG. 3(a)). Further, the axis G2 is at a plus angle θ to the axis G8, the axis G7 of the plug member 22 becomes at an angle of 2θ to the axis G8 of the sleeve member 23 (see FIG. 3(a)).

In this way, since the axis Gα of the inner spherical part 27 transverses at the angle θ to the axis G7 of the plug member 22, it is possible to expand a scope of movement, namely, bending or rotation, of the plug member 22, and to move universally the plug member 22 relative to the intermediate tubular member 21 in the scope of the maximum, 2θ.

The sleeve member 23 is rotatable relative to the intermediate tubular member 21 since the cylindrical part 25 of the intermediate tubular member 21 is inserted rotatably in the hole in the cylindrical portion 30. At this time, the axis G8 of the sleeve member 23 coincides constantly with an axis G9 of the intermediate tubular member 21 to be easy to connect the horse or the like with the sleeve member 23 without a direction of force being deviated from the axis G8 when the horse is connected with the sleeve member.

It should be noted that when the horse or the like is connected with the plug member 22, it is possible to easily connect the horse with the plug member 22 by moving only the plug member departing from the sleeve member 23. Consequently, the present invention provides a universal joint having a good operationality.

Figure 4:
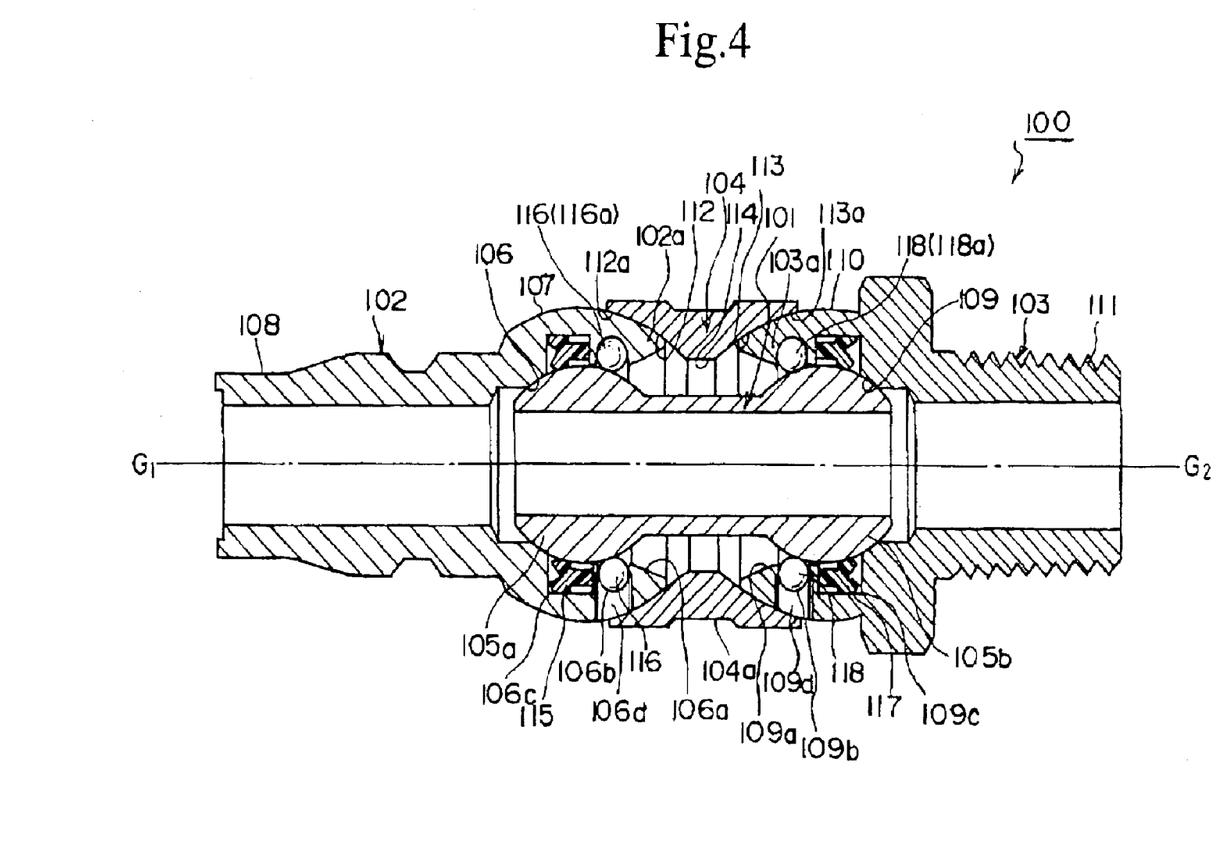
FIG. 4 is a sectional view showing a second embodiment of the universal joint according to the present invention.

Referring to FIG. 4, a second embodiment of a universal joint according to the present invention is shown.

In FIG. 4, reference numeral 100 denotes the universal joint. The universal joint comprises a plug member 102 as a first tubular member, a sleeve member 103 as a second tubular member and an intermediate tubular member 101 for connecting the plug and sleeve members 102 and 103.

It should be noted that a cover 104 is provided between the plug and sleeve members 102 and 103.

The intermediate tubular member 101, plug member, sleeve member 103 and cover are hollow and made of, for example, metal, aluminum or stainless or the like. They may be made of synthetic resin, rubber or the like having a hardness, namely, the property of maintaining a shape.

The intermediate tubular member 101 has at the opposite ends first and second outer spherical parts 105a and 105b, respectively.

The plug member 102 is formed with at one end 102a a first inner spherical part 106 and at the other end a plug portion 108. The first outer spherical part 105a is inserted into the first inner spherical part 106 so that the plug member 102 can be moved universally relative to the intermediate tubular member 101. A first spherical portion 107 concentric with the first inner spherical part 106 is formed on the one end 102a of the plug member 102.

The plug portion 108 is inserted into a horse, socket or the like (not shown) to connect the plug member with the horse.

The sleeve member 103 has at one end 103a a second inner spherical part 109 and at the other end a threaded sleeve portion 111. The second outer spherical part 105b of the intermediate tubular member 101 is inserted into the second inner spherical part 109 of the sleeve member 103 so that the sleeve member 103 is moved universally relative to the intermediate tubular member 101. A second spherical portion 110 concentric with the second inner spherical part 109 is formed at the one end 103a of the sleeve member 103.

A horse or the like (not shown) is also connected with the sleeve portion 111 of the sleeve member 103.

A ball bearing 116a is provided between the first outer spherical part 105a and the first inner spherical part 106.

The ball bearing 116a supports the first outer spherical part 105a of the intermediate tubular member 101 to move universally and acts to prevent the first outer spherical part 105a from removing out of the first inner spherical part 106.

The ball bearing 116a is composed of a plurality of balls 116 which are inserted into an annular groove 106b formed on the first inner spherical part 106, similarly as in the aforementioned first embodiment.

Similarly, a ball bearing 118a is provided between the second outer spherical part 105b and the second inner spherical part 109.

The ball bearing 118a performs the same function as that of the aforementioned ball bearing 116a.

The balls 116 are inserted through a threaded hole 106d formed in the first spherical portion 107 into the annular groove 106b, thereafter, a screw (not shown) is screwed in the threaded hole 106d to prevent the balls from removing out of the annular groove 106b.

An opening end 106a of the first inner spherical part 106 and an opening end 109a of the second inner spherical part 109 have tapers for expanding toward outside.

The ball bearing 118a is composed of a plurality of balls 118 which are inserted into an annular groove 109b formed in the second spherical portion 110. The balls 118 are inserted through a threaded hole 109d formed in the spherical portion 110 at the position of the annular groove 109b. After the balls are inserted in the annular groove 109b, a screw (not shown) is screwed in the hole 109d to prevent the balls from removing out of the annular groove 109b.

Provided adjacent to the annular groove 106b is an annular groove 106c in which a first seal member 115 is contained to contact with the first outer spherical part 105a under pressure and provided adjacent to the annular groove 109b is an annular groove 109c in which a second seal member 117 is contained to contact with the second outer spherical part 106b under pressure.

The first and second seal members 115 and 117 are made of synthetic resin.

In the embodiment as shown in FIG. 4, the seal members 115 and 117 are comprised of Y-shaped packing.

With the above construction, it is possible to move universally the plug member 102 relative to the intermediate tubular member 101 and the sleeve member 103 relative to the intermediate tubular member 101, respectively.

The cover 104 is arranged between the first and second spherical portions 107 and 110 to cover a space between these first and second spherical portions, thus preventing any dirt from entering in the universal joint, especially, between the first outer spherical part 105a and first inner spherical part 106 and between the second outer spherical part 105b and second inner spherical part 109.

The cover 104 has a shape of ring. An inner circumferential surface in one end of the cover 104 is formed into a first inner spherical surface 112 and an inner circumferential surface in the other end of the cover is formed into a second inner spherical surface 113. The first inner spherical surface 112 is adapted to slidably contact with an outer surface of the first spherical portion 107 and the second inner spherical surface 113 is adapted to contact slidably with an outer surface of the second spherical portion 110.

Consequently, in the second embodiment, the plug member 102 is moved universally relative to the cover 114 and the sleeve member 103 is moved universally relative to the cover 114 because the first and second spherical portions contact universally with the cover. Provided on a central portion 114 of the cover is an annular step 104a which is depressed slightly it, as shown in FIG. 1. Forming the annular step causes hands of a user to prevent from slipping when the user grippes the cover and accomplishes weight saving of the cover.

In the universal joint 100 structured as described above, the horse or the like is first connected with the sleeve portion 111 by screwing sleeve portion in the horse and the horse or the like is connected with the plug member 102 by screwing the plug portion 108 in the horse or the like. The sleeve portion or plug portion may be inserted in a socket and so on connected with the horse or the like.

From the above, it is possible to change universally an angle forming by an axis G1 of the plug member 102 and an axis G2 of the sleeve member 103 to obtain a good operationality when the horse or the like is connected with the plug or sleeve member.

Figure 5A:
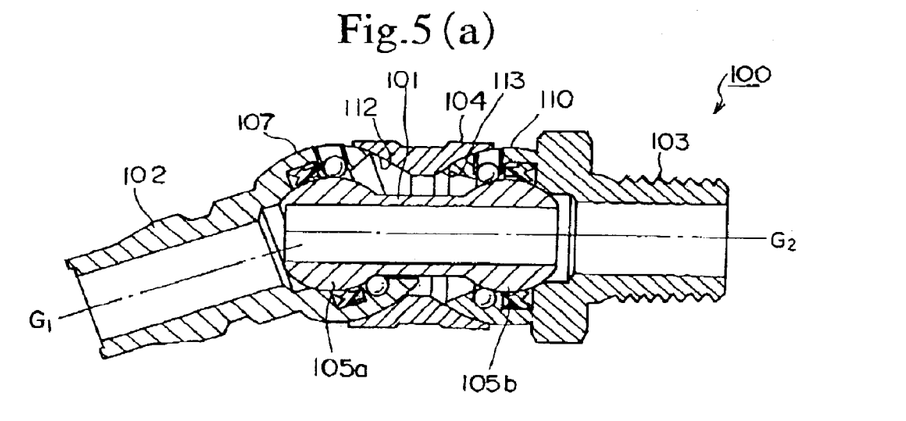
FIGS. 5(a) and (b) are sectional views for explaining an operation of the universal joint in the second embodiment.

Here, when the axis G1 of the plug member 102 is inclined to the an axis of the intermediate tubular member 101, even though the cover 104 does not follow to the plug member 102, it is possible to change smoothly an angle formed by the axes G1 and G2 of the plug and sleeve members 102 and 103 in any direction because the plug member is moved universally relative to the cover 104 as described above to prevent the horse or the like from twisting, as shown in FIG. 5(a).

Figure 5B:
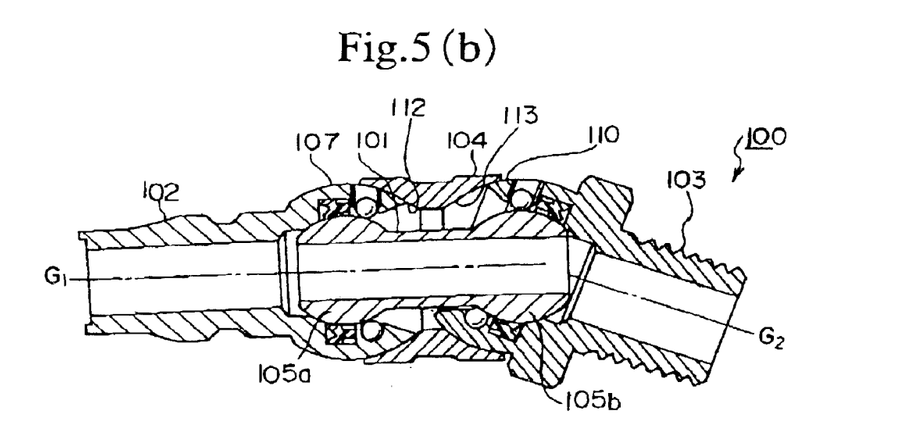

As shown in FIG. 5(b), when the axis G2 of the sleeve member 103 is inclined to the an axis of the intermediate tubular member 101, even though the cover 104 does not follow to the sleeve member 103, it is possible to change smoothly an angle formed by the axes G1 and G2 of the plug and sleeve members 102 and 103 in any direction because the plug member is moved universally relative to the cover 104 as described above to prevent the horse or the like from twisting.

Further, it is possible to carry out complex movement of the universal joint and therefore to carry out extensive use of the universal joint as shown in FIGS. 5(a) and 5(b). It should be noted that the cover 104 does not deform under influence of a force exerted from the outside and therefore it is easy to contact with and remove from the plug member 108 with the horse or the like by gripping with hands the cover. Further, when the user grippes the cover, it is easy to grip the cover due to the annular step 104a.

The cover can be made of synthetic resin, metal and the other any material.

Figure 6:
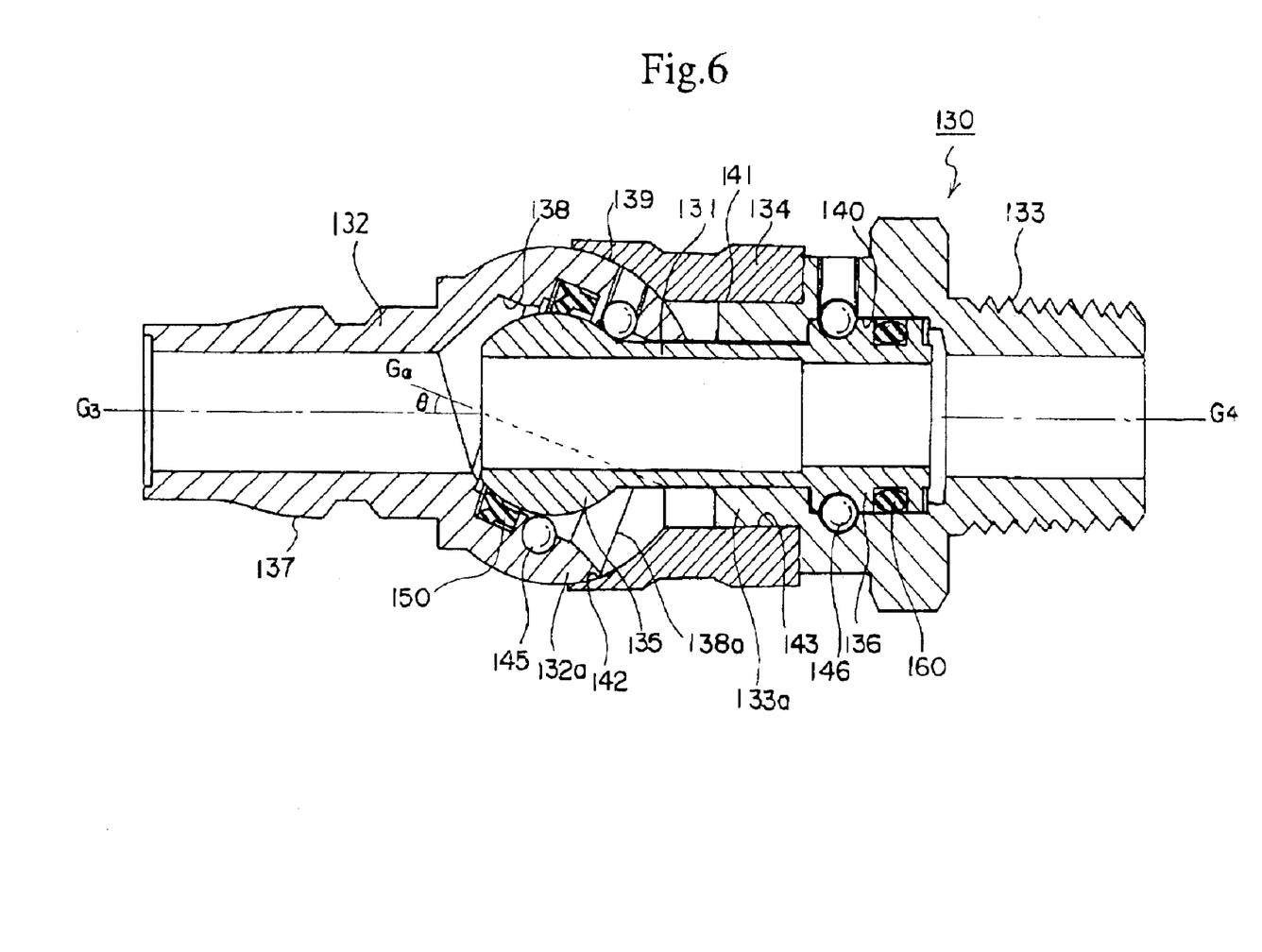
FIG. 6 is a sectional view showing a third embodiment of the universal joint according to the present invention.

Referring to FIG. 6, a third embodiment of a universal joint according to the present invention is shown. The universal joint 130 comprises a plug member 132 as a first tubular member, a sleeve member 133 as a second tubular member and an intermediate tubular member 131 for connecting the plug and sleeve members 132 and 133 and a cover 134 disposed between the plug and sleeve members 132 and 133.

The intermediate tubular member 131 is formed with at one end an outer spherical part 135 and at the other end a cylindrical part 136.

One end portion 132a of the plug member 132 is provided with an inner spherical part 138 in which the outer spherical part 135 is inserted to move universally. The one end portion is also provided with an outer spherical part 139 which is concentric with the inner spherical part 138. An axis Gα of the inner spherical part 138 is inclined at an angle θ to an axis G3 of the plug member 132. An opening end 138a of the inner spherical part 138 has a taper expanding toward outside of the spherical part. One end 133a of the sleeve member 133 is provided with an inner cylindrical portion 140 in which the cylindrical part 136 is inserted ratatably. The end 133a of the sleeve member 133 is also provided with an outer cylindrical portion 141 concentric with the inner cylindrical portion 140.

One end of an inner circumferential surface of the cover 134 is formed into a spherical surface 142 and the other end the cover is provided with a cylindrical portion 143 in which the one end 133a of the sleeve member 133 is rotatably inserted.

The plug member 132 and intermediate tubular member 131 are connected movably universally by a ball bearing 145 together with preventing the outer spherical part 135 from removing out of the inner spherical part 138 and the sleeve member 133 and intermediate tubular member 131 are connected rotatably by a ball bearing 146 together with preventing the cylindrical part 136 from removing out of the inner cylindrical portion 140.

Seal members 150 and 160 are provided between the outer spherical part 135 and inner spherical part and between the cylindrical part 136 and inner cylindrical portion 140, respectively.

In the aforementioned universal joint, the plug member 132 can be moved universally relative to the intermediate tubular member 131 and cover 134 and sleeve member 133 can be moved rotatably relative to the cover 134 and intermediate tubular member 131. With the construction, it is possible to prevent the horse connected with plug member 132 or sleeve member 133 from twisting to provide a good operetionality.

In the aforementioned third embodiment, an angle between the axes G3 and G4 of the plug and sleeve members 132 and 133 can be changed freely without deforming the cover 134 since the plug member moves universally relative to the cover and intermediate tubular member.

According to the present invention, when the plug or sleeve member is connected with the horse or the like, the direction of axes of the plug and sleeve members is stable and therefore it is possible to firmly connect with and disconnect from the horses or the like with the plug and sleeve members. According to the present invention, it is also possible to provide a universal joint having a long life of cover and a good operationality and usability thereof.

Although the embodiments of the present invention have been explained as the above, it should be noted that some changes and modifications can be made to the above embodiments without departing from the scope of the present invention.

What is claimed is:

1. A universal joint comprising:
    a first tubular member;
    a second tubular member; and
    an intermediate tubular member for connecting said first and second tubular members;
    said intermediate tubular member having at one end an outer spherical part and at the other end a cylindrical part, said first tubular member having at one end an inner spherical part in which said outer spherical part of the intermediate tubular member is inserted to move universally, and said second tubular member having at one end a hole in which said cylindrical part of the intermediate tubular member is rotatably inserted,
    said inner spherical part having an axis oblique at an angle to an axis of the outer spherical part of the intermediate tubular member.

2. The universal joint according to claim 1, wherein ball bearings are provided between said outer and inner spherical parts and between said hole of the second tubular member and cylindrical part of the intermediate tubular member.

3. The universal joint according to claim 1, wherein means for sealing are provided between said outer and inner spherical parts, and between said hole of the second tubular member and cylindrical part of the intermediate tubular member.

4. The universal joint according to claim 2, wherein each of said ball bearings comprises a plurality of balls.

5. The universal joint according to claim 3, wherein each of said means for sealing comprises a seal member of elastic material.

6. A universal joint comprising:
    a first tubular member;
    a second tubular member;
    an intermediate tubular member for connecting movably said first and second tubular members; and
    a cover disposed between said first and second tubular members to cover a space therebetween,
    said cover having at one end a first inner spherical surface and at the other end a second inner spherical surface, said first tubular member having at one end a first spherical portion and said second tubular member having at one end a second spherical portion, said first inner spherical surface of the cover being contacted movably and universally with the first spherical portion of the first tubular member and said second inner spherical surface of the cover being contacted movably and universally with said second spherical portion of said second tubular member.

7. The universal joint according to claim 6, wherein said cover has a first end which is connected with said first tubular member to move universally relative to said first tubular member, and
    said cover has a second end which is connected with said second tubular member to rotate relative to said second tubular member.

8. The universal joint according to claim 6, wherein said cover does not deform when said first and second tubular members are moved.

9. The universal joint according to claim 6, wherein said cover is made of a hardening material.

* * * * *